US012705198B2

(12) United States Patent
Sheth

(10) Patent No.: US 12,705,198 B2
(45) Date of Patent: Aug. 11, 2026

(54) AUTOMATED HOST RECOVERY OF PERIPHERAL-INITIATED COMMUNICATIONS LINKS

(71) Applicant: ZEBRA TECHNOLOGIES CORPORATION, Lincolnshire, IL (US)

(72) Inventor: Maulin Sheth, Central Islip, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/519,967

(22) Filed: Nov. 27, 2023

(65) Prior Publication Data

US 2025/0173295 A1 May 29, 2025

(51) Int. Cl.
*G06F 13/38* (2006.01)

(52) U.S. Cl.
CPC .......... *G06F 13/387* (2013.01); *G06F 13/385* (2013.01)

(58) Field of Classification Search
CPC ............................. G06F 13/387; G06F 13/385
See application file for complete search history.

(56) References Cited

U.S. PATENT DOCUMENTS 6,647,452 B1 * 11/2003 Sonoda ............... G06F 13/4291 710/72
6,671,831 B1 * 12/2003 Sartore ............... G06F 13/4278 714/E11.023
8,438,319 B1 * 5/2013 Edney ...................... H05K 7/10 710/17
12,126,171 B1 * 10/2024 Chiluvuri ............... G06Q 50/06
2011/0271019 A1 * 11/2011 Ishii ...................... G06F 13/385 710/63
2015/0081938 A1 * 3/2015 Berrebi ............... G06F 13/4068 710/106
2018/0108231 A1 * 4/2018 Leyden .................. G08B 25/10
2019/0347230 A1 * 11/2019 Bender ................... G01S 19/14
2022/0301410 A1 * 9/2022 Erdmann, IV ........ H04W 4/021

* cited by examiner

*Primary Examiner* — Henry Tsai
*Assistant Examiner* — Aurangzeb Hassan

(57) ABSTRACT

A method includes: establishing a connection with a peripheral device; storing an identifier of the peripheral device and an operational state of the peripheral device; periodically updating the stored operational state of the peripheral device; subsequent to disconnection of the peripheral device, retrieving the stored operational state of the peripheral device; determining whether the stored operational state satisfies a criterion indicating that the disconnection was intentional; and controlling a reconnection with the peripheral device based on the determination.

10 Claims, 6 Drawing Sheets

AUTOMATED HOST RECOVERY OF PERIPHERAL-INITIATED COMMUNICATIONS LINKS

BACKGROUND

A mobile computing device such as a tablet computer, wrist-mounted computer, or the like, can be employed with a peripheral or accessory device such as a barcode scanner (e.g., a finger-mounted scanner, a pistol-grip scanner, or the like). The peripheral may communicate with the mobile computing device via a wireless connection, e.g., based on the Bluetooth™ standard. The peripheral can be configured to initiate the wireless connection, but under certain conditions may not detect a loss of the wireless connection.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
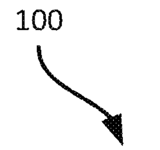
FIG. 1 is a diagram of a system for automated recovery of peripheral-initiated communications links.
Figure 1:
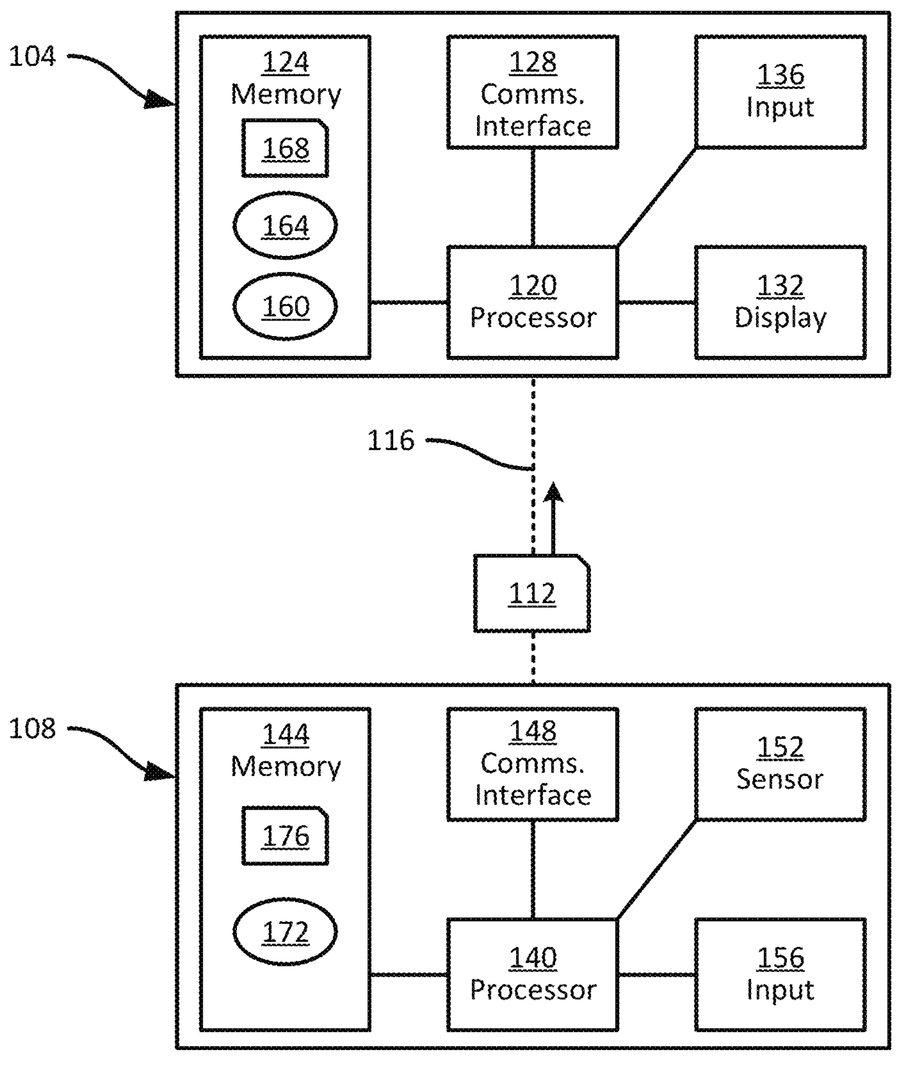

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method, comprising: establishing a connection with a peripheral device; storing an identifier of the peripheral device and an operational state of the peripheral device; periodically updating the stored operational state of the peripheral device; subsequent to disconnection of the peripheral device, retrieving the stored operational state of the peripheral device; determining whether the stored operational state satisfies a criterion indicating that the disconnection was intentional; and controlling a reconnection with the peripheral device based on the determination.

Additional examples disclosed herein are directed to a computing device, comprising: a communications interface; a memory; and a processor configured to: establish, a connection with a peripheral device via the communications interface; store, in the memory, an identifier of the peripheral device and an operational state of the peripheral device; periodically update the stored operational state of the peripheral device; subsequent to disconnection of the peripheral device, retrieve the stored operational state of the peripheral device; determine whether the stored operational state satisfies a criterion indicating that the disconnection was intentional; and control a reconnection with the peripheral device based on the determination.

Further examples disclosed herein are directed to a method, comprising: receiving, at a peripheral device from a first host device, a command to initiate a reconnection with the host device, the command containing a first identifier of the host device; determining, at the peripheral device, whether the peripheral device has an active connection with a second host device; retrieving, from a memory at the peripheral device, a reference identifier corresponding to a preceding host connection; and when the reference identifier matches the first identifier, initiating, at the peripheral device, a connection with the first host device.

FIG. 1 illustrates a system 100 for short-range communications between devices. The system 100 includes a host computing device 104, such as a tablet computer, a laptop computer, a wrist-mounted computer, a smartphone, or the like. The system 100 also includes a peripheral device 108, such as a barcode scanner (e.g., a ring scanner configured to be mounted on a hand of an operator, a pistol-grip scanner, or the like), a printer (e.g., a portable label printer), or the like. An operator of the host device 104 may also operate the peripheral device 108 to perform a wide variety of tasks, e.g., in which the peripheral device 108 extends the range of functions available to the host device 104. For example, when the peripheral device 108 is a barcode scanner, the operator can use the peripheral device 108 to scan barcodes on packages in a transport and logistics facility, products in a retail facility, or the like. The barcodes decoded by the peripheral device 108 can be provided to the host device 104 for further processing, e.g., uploading to a central database, retrieving and displaying information corresponding to the barcode, and the like.

More generally, the peripheral device 108 can be configured to capture data 112 (such as object identifiers decoded from barcodes) and transmit the data 112 to the host device 104 for further processing, e.g., over a wireless link 116. The link 116 can be bidirectional, and in other examples, the peripheral device 108 can therefore receive data from the host device and generate labels, receipts, or the like, based on the received data. The peripheral device 108 can also receive other data from the host device 104, including commands for controlling the establishment or re-establishment of the link 116. The link 116 can be based on a short-range communications standard, such as Bluetooth™, e.g., using a suitable one of the Bluetooth (also sometimes referred to as Bluetooth Classic) protocol and the Bluetooth Low Energy (BLE) protocol.

Certain components of the devices 104 and 108 are shown in FIG. 1. The host device 104 includes, in the illustrated example, a processor 120, such as a central processing unit (CPU), a graphics processing units (GPU), or the like. The processor 120 is connected with a non-transitory storage medium, such as a memory 124. The memory 124 can be implemented as any suitable combination of volatile and non-volatile memory elements. The host device 104 also includes a communications interface 128, including any suitable combination of transceivers, antenna elements, and the like to facilitate wireless communication between the device 104 and other devices, such as the peripheral device 108.

The host device 104 can also include various input and output devices, including a display 132 and an input 136 such as a touch screen integrated with the display 132, a keypad, or the like. The host device 104 can also include, in some examples, microphones, speakers, and the like (not shown). Certain components of the host device 104 can be implemented, in some examples, as integrated components of a system on a chip (SoC), or the like.

The peripheral device 108 includes, in the illustrated example, a processor 140, such as a central processing unit (CPU), a graphics processing units (GPU), or the like. The processor 140 is connected with a non-transitory storage medium, such as a memory 144. The memory 144 can be implemented as any suitable combination of volatile and non-volatile memory elements. The peripheral device 108 also includes a communications interface 148, including any suitable combination of transceivers, antenna elements, and the like to facilitate wireless communication between the peripheral device 108 and other devices, such as the host device 104. As discussed below in greater detail, establishing the link 116 includes a pairing process by which the devices 104 and 108 obtain one another's identifiers such as media access control (MAC) addresses, generate and store encryption keys, and the like. In this implementation, the pairing process is initiated by the peripheral device 108, rather than by the host device 104.

The peripheral device 108 can also include a sensor 152, such as an image-based barcode scanner or the like. In other examples, in addition to or instead of the sensor 152, the peripheral device 108 can include one or more other effector assemblies, such as a radio frequency identification (RFID) reader, a print head and associated hardware elements for printing labels, or the like. The peripheral device 108 can also include an input 156, such as a button, trigger, or the like, e.g., actuation of which by an operator of the peripheral device 108 can cause the capture and decoding of a barcode, and the transmission of the data 112 (e.g., containing the results of the decoding) to the host device 104. In other examples, the peripheral device 108 can include other input and/or output devices, such as a display, a speaker, and the like.

As noted earlier, the peripheral device 108 is configured to initiate establishment of the link 116. For example, pairing of the devices 104 and 108 to establish the link 116 can be initiated by scanning, with the peripheral device 108, a barcode affixed to or otherwise associated with the host device 104 and encoding an identifier of the host device 104 (e.g., a MAC address). In other examples, pairing can be initiated via near-field communication (NFC), e.g., by tapping the peripheral device 108 against the host device 104, bringing the devices 104 and 108 sufficiently close for the peripheral device 108 to obtain the MAC address or other identifier of the host device 104 via.

Having decoded the identifier, the device 108 is configured to transmit a pairing message to the host device 104, addressed using the above identifier. Once the link 116 is established, the peripheral device 108 can provide further decode results or other data to the host device 104.

Under certain conditions, the devices 104 and 108 may be disconnected (e.g., the link 116 may be terminated). Some of those conditions may be intentional, e.g., when an operator of the host device 104 disables the communications interface 128, when the battery of the peripheral device 108 is removed for replacement with a fresh battery, or the like. Under other conditions, however, the disconnection may be unintentional. For example, certain software process terminations at the host device 104 may terminate the link 116 without direct input from an operator of the host device 104 to terminate the link 116. Because the peripheral device 108 is configured to initiate establishment of the link 116, and unintentional disconnections may originate at the host device 104, the peripheral device 108 may be unable to readily determine whether a disconnection was intentional or not, and is therefore not configured to automatically attempt to reconnect to the host device 104.

As discussed below, the host device 104 and the peripheral device 108 implement various additional functionality permitting the device 104 to determine whether a disconnection from the device 108 was likely to be intentional. When the disconnection is unlikely to have been intentional, the host device 104 can command the peripheral device 108 to initiate a reconnection to re-establish the link 116.

The memory 124 stores computer-readable instructions, e.g., including one or more applications executable by the processor 120. In this example, the memory 124 stores an application 160 configured to receive and process decode results, e.g., contained in the data 112. The application 160 can be configured, for example, to track order fulfillments, transmit decoded data to a server (not shown), or the like. The memory 124 can also store an intermediation application 164, which may also be referred to as the peripheral framework 164 or simply the framework 164. The framework 164 is executable by the processor 120 to manage connections with the peripheral device 108, e.g., and provide an application programming interface (API) usable by the application 160 (and various other applications) to obtain barcode scanning results. The framework 164, in other words, may simplify the process of obtaining decode results from the peripheral device 108 by applications such as the application 160.

The memory 124 can also store various other computer-executable instructions, e.g., including an operating system or the like. In some examples, the operating system may implement processes (also referred to as "low memory killer" or LMK processes) that seek and terminate other processes, e.g., to reclaim volatile memory for other uses. Under certain conditions, an LMK process may terminate the framework 164 or a component thereof, which can in turn lead to an unintentional disconnection of the peripheral device 108 from the host device 104. In other examples, a driver, firmware, or the like, for the communications interface 128 may crash or suffer other instability, which can also lead to an unintentional disconnection of the peripheral device 108 from the host device 104. To detect such unintentional disconnections and determine whether to command the peripheral device 108 to reconnect, the framework 164 can store an identifier of the peripheral device 108, as well as an operational state of the peripheral device 108, in a dedicated portion 168 of the memory 124. The portion 168 is persistent, and can therefore be referred to following a termination of the framework 164, a reboot of the device 104, or the like.

The peripheral device 108 also stores computer-executable instructions in the memory 144, such as an application 172 (e.g., firmware of the device 108) executable by the processor 140 to control the sensor 152 and provide the data 112 to the host device 104, as well as to initiate the establishment of the link 116, and respond to reconnection commands from the host device 104, as described below. In some examples, the device 108 can also persistently store, in a portion 176 of the memory 144, an identifier of the host device 104.

Figure 2:
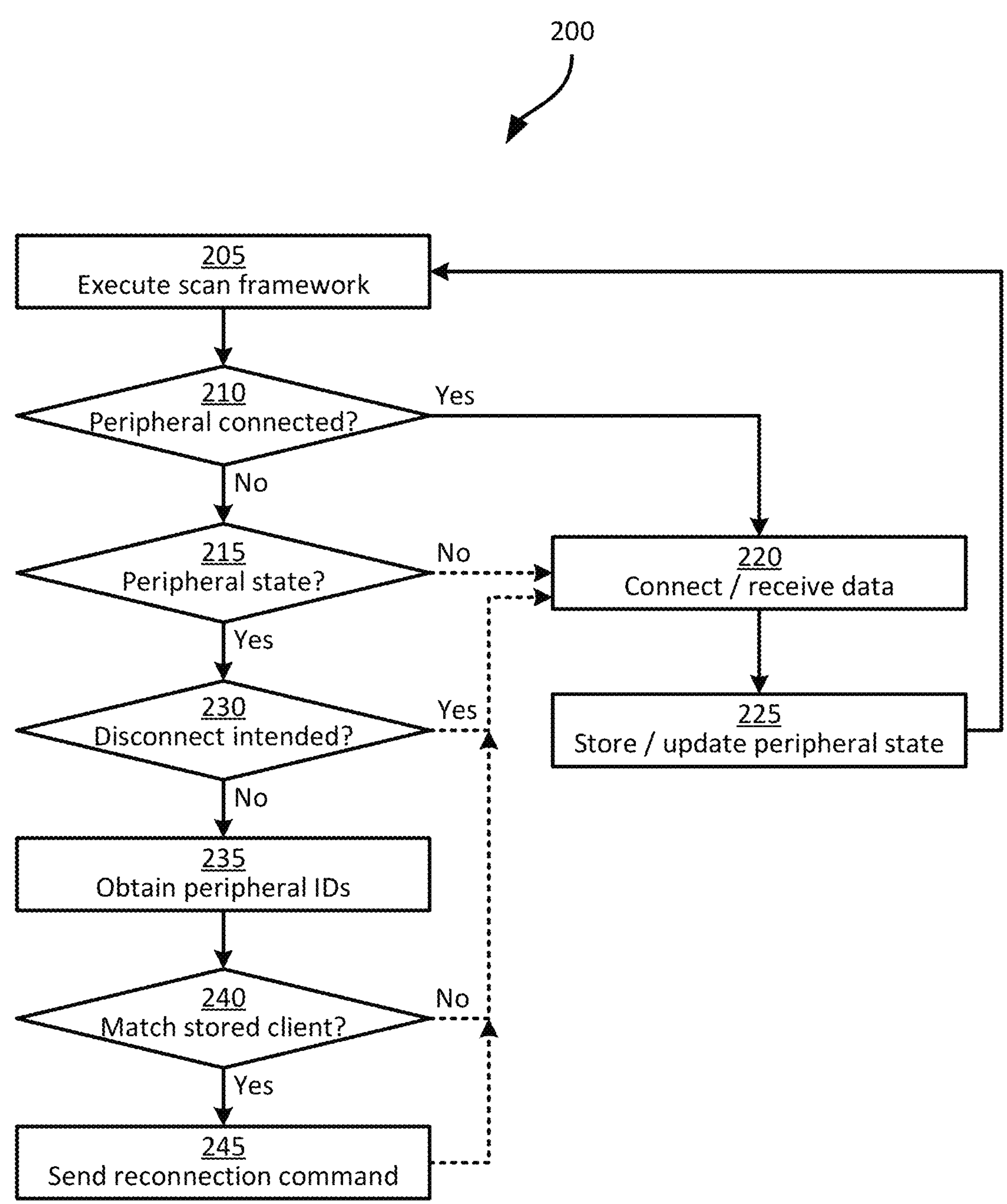
FIG. 2 is a flowchart of a method for automated recovery of peripheral-initiated communications links.

Turning now to FIG. 2, a method 200 for automated recovery of peripheral-initiated communications links is illustrated. The method 200 is discussed below in conjunction with performance of the method 200 by the host device 104, e.g., via the execution of the framework 164 by the processor 120.

At block 205, the host device 104 is configured to execute the framework 164. For example, the host device 104 can be configured to launch the framework 164 when the host device 104 detects that the framework 164 is not currently active (e.g., because the framework 164 was terminated by an LMK process). The host device 104 can also be configured to launch the framework 164 at startup, for example. In other words, at block 205, the processor 120 is configured to execute the framework 164, which includes launching the framework 164 in the event that the framework 164 was not already active.

At block 210, the host device 104 is configured to determine whether a peripheral device is connected with the host device 104. As will be apparent, the system 100 can include a plurality of peripheral devices 108, and the host device 104 can be configured to determine whether any one of those peripheral devices 108 is connected at block 210. When the determination at block 210 is negative, the host device 104 proceeds to block 215.

At block 215, the host device 104 is configured to determine whether the portion 168 of the memory 124 contains a stored peripheral identifier and operational state. The presence of such data in the portion 168 indicates that a link 116 was active at some point in the past, and has been terminated. It may not yet be clear, however, whether the termination of the link 116 was intentional (e.g., resulting from a reboot of the host device 104, a battery swap at the peripheral device 108, or the like), or unintentional (e.g., resulting from a termination of the framework 164 by an LMK process, or the like).

The determination at block 215 can include determining whether or not the portion 168 contains data. The determination at block 215 can also, in some examples, including determining whether data in the portion 168 has an age below a predetermined threshold (e.g., one hour, one day, or the like; a wide variety of other thresholds can also be employed, including thresholds shorter than one hour or longer than one day). In such embodiments, when the portion 168 contains data but that data is older than the threshold, the determination at block 215 may still be negative.

When the determination at block 215 is negative, the host device 104 proceeds to block 220. As also seen in FIG. 2, following an affirmative determination at block 210, the host device 104 also proceeds to block 220. At block 220, the host device 104 can establish a connection with the peripheral device 108 if not previously connected (e.g., following block 215), and receive or otherwise exchange data with the peripheral device 108. If the peripheral device 108 was previously connected (e.g., following an affirmative determination at block 210), the performance of block 220 need not include establishing a connection, and the host device 104 can receive or exchange data with the peripheral device 108.

As noted above, establishing a connection at block 220, if applicable, can include receiving a pairing initiation message from the peripheral device 108, e.g., generated by the peripheral device 108 in response to scanning a barcode encoding an identifier of the host device 104. Following establishment of the connection, the host device 104 can receive data decoded from barcodes by the peripheral device 108, e.g., for processing via the application 160.

At block 225, e.g., while the connection established at block 220 (or an earlier performance of block 220) is active, the host device 104 can store, or updated if already stored, state data associated with the peripheral device 108. In particular, the host device 104 can be configured to store, in the portion 168 of the memory 124, an identifier of the peripheral device 108 such as a MAC address, as well as a current operational state of the peripheral device 108. The operational state, also referred to as a state machine indicator, indicates which of a predetermined set of operational states is currently active (as of the storage or update operation at block 225) at the peripheral device 108. The operational state can be determined by the host device 104 (e.g., via execution of the framework 164), reported by the peripheral device 108, or a combination thereof. Example operational states are discussed below in conjunction with FIGS. 3A-3C.

Following block 225, the host device 104 returns to block 205, to continue execution of the framework 164 or, in some cases, launch the framework 164 if the host device 104 has been rebooted, the framework 164 was unexpectedly terminated, or the like. As will now be apparent, in the absence of interruptions to the link 116 and the regular operation of the host device 104 and the peripheral device 108, the performance of the method 200 at the host device 104 can cycle through blocks 205, 210, 220, and 225.

Figures 3A, 3B, 3C:
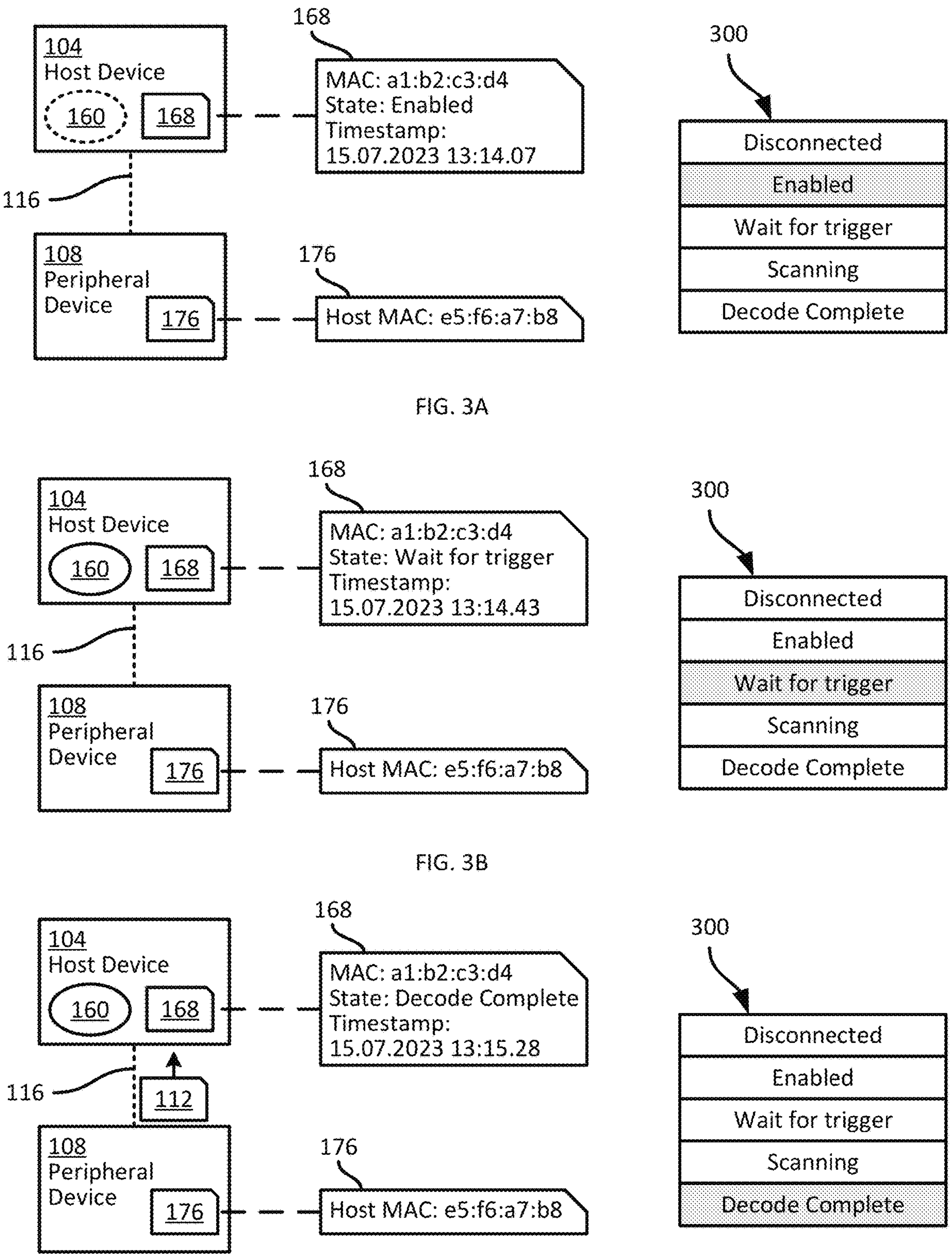
FIG. 3A is a diagram illustrating an example performance of blocks 205, 210, 220 and 225 of the method of FIG. 2.
FIG. 3B is a diagram illustrating another example performance of blocks 205, 210, 220 and 225 of the method of FIG. 2.
FIG. 3C is a diagram illustrating a further example performance of blocks 205, 210, 220 and 225 of the method of FIG. 2.

Turning to FIG. 3A, FIG. 3B, and FIG. 3C, examples of periodically updated operational states for the peripheral device 108 are illustrated. Each of FIGS. 3A-3C illustrates an example set of operational states 300, with one operational state highlighted to indicate the state illustrated in the corresponding drawing. For example, FIG. 3A shows the link 116 having been established (e.g., after a first performance of block 220). The application 160 has not yet been launched, and is therefore illustrated in dashed lines. The framework 164 can, at a first performance of block 225, write data to the portion 168 including a MAC address "a1:b2:c3:d4" of the peripheral device 108, as well as the operational state "enabled". The state machine indicator "enabled" indicates that the peripheral device 108 is connected to the host device 104, and is ready for use, but is currently idle because no host application (e.g., the application 160) is currently active to consume the data 112 received by the framework 164 from the peripheral device 108.

FIG. 3B illustrates a subsequent performance of block 225, e.g., after the application 160 is launched (and therefore illustrated in solid lines in FIG. 3B). The operational state in the portion 168 is therefore updated to "wait for trigger", indicating that the peripheral device 108 is connected and ready for use, and that a host application is also active. The portion 168 also includes a timestamp, e.g., indicating the date and time of the most recent update to the data stored in the portion 168. FIG. 3C illustrates a further performance of block 225, e.g., following an input at the peripheral device 108 and a successful decoding, resulting in a transmission of data 112 to the host device 104. The operational state of the peripheral device 108 in the portion 168 has been updated to "decode complete", along with a new timestamp. As will be apparent, between the states shown in FIGS. 3B and 3C, the operational state stored in the portion 168 is "Scanning", e.g., after activation of the input 156 and before completion of the resulting scan. A further performance of blocks 205, 210, 220, and 225 shortly after FIG. 3C may lead to the operational state in the portion 168 being updated to "wait for trigger". As also seen in FIGS. 3A-3C, the peripheral device 108 can store, in the portion 176, a MAC address or other identifier corresponding to the host device 104.

Following one or more of the above cycles, accompanied by periodic updates to the operational state stored in the portion 168, the peripheral device 108 may be disconnected from the host device 104. Under such circumstances, the determination at block 210 is negative, but due to previous performances of block 225, the portion 168 is not empty, and the determination at block 215 is therefore affirmative. Persistent storage of the operational state in the portion 168, as will be apparent, enables later reference to the portion 168 even following a reboot of the host device 104, a restart of the framework 164, or the like.

Following an affirmative determination at block 215, the host device 104 (e.g., via execution of the framework 164) is configured to determine, at block 230, whether the disconnection with the peripheral device 108 was likely to be intentional. A variety of conditions can lead to a disconnection, resulting in the storage of data in the portion 168, but no active connection with the peripheral device 108. Based on the determination at block 230, the host device 104 is configured to control a reconnection with the peripheral device 108, e.g., by commanding the peripheral device 108 to initiate a reconnection in some cases, and suppressing or omitting such a command in other cases.

An examples of a disconnection considered intentional includes a reboot of the host device 104. Rebooting the host device 104 may be initiated by the operator of the device 104, and even in cases where the reboot is not operator-initiated, the reboot is readily perceptible to the operator, and automated action to attempt to recover the link 116 without operator involvement may be unnecessary. A further example of an intentional disconnection includes disabling of the communications interface 128, e.g., via receipt of a command from the operator of the device 104 to disable the interface 128. A further example of an intentional disconnection includes placing the peripheral device 108 in a charging cradle, and/or removing a battery of the peripheral device 108 to insert a fresh battery.

Intentional disconnections of the peripheral device 108 share certain properties, such as occurring without interrupting the operation of the framework 164. The framework 164 can therefore, in response to such disconnections, further update the portion 168 to indicate that the operational state of the peripheral device 108 is "disconnected".

Unintentional disconnections can be distinguished from intentional disconnections in that the framework 164 may not update the portion 168, e.g., because the operation of the framework 164 itself may be interrupted during the disconnection. For example, the termination of the framework 164 by an LMK process is considered an unintentional disconnection, and due to its termination, the framework 164 does not update the portion 168, in response to such an event. For example, following the state shown in FIG. 3C, if the framework 164 is terminated by an LMK process, or if the framework 164 crashes, the link 116 may be lost, but the portion 168 may not be updated, and may therefore still contain the operational state "Decode Complete".

Figure 4:
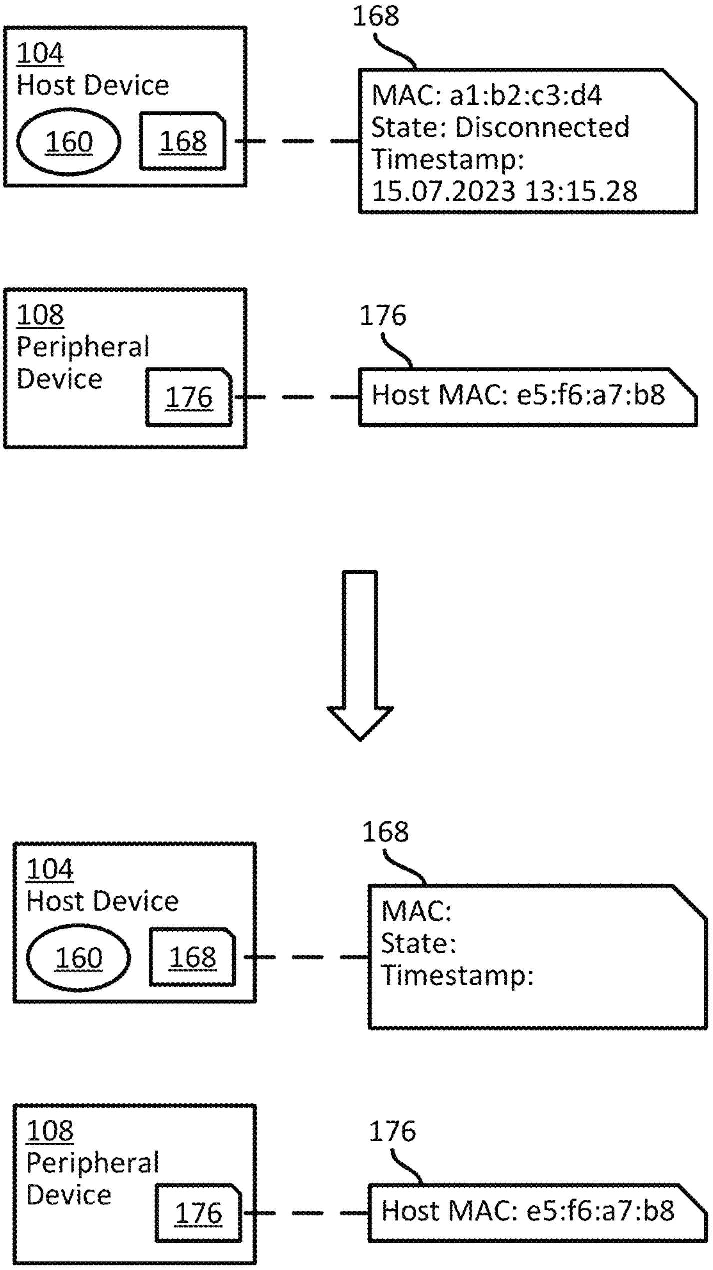
FIG. 4 is a diagram illustrating an outcome of an example affirmative determination at block 230 of the method of FIG. 2.

To determine whether a disconnection was likely intentional, the host device 104 is configured to retrieve the operational state from the portion 168, and to determine whether the operational state satisfies a criterion indicating that the disconnection was intentional. The criterion, in this example, is whether the operational state stored in the portion 168 is the "disconnected" state. When the operational state is "disconnected" the determination at block 230 is affirmative, and the host device 104 proceeds to block 220, e.g., to await manual re-establishment of a link with the peripheral device 108, or with a different peripheral device. In response to an affirmative determination at block 230, the host device 104 can be configured to delete the content of the portion 168, as shown in FIG. 4.

When the determination at block 230 is negative, indicating that the disconnection of the peripheral device 108 may have been unintentional, the host device 104 is configured to proceed to block 235. In some examples, the determination at block 230 can include comparing the timestamp in the portion 168 to a threshold, e.g., to determine whether the most recent operational state stored in the portion 168 is more recent than the threshold. When the most recent operational state stored in the portion 168 is older than the threshold, the determination at block 230 may be affirmative, regardless of the operational state itself At block 235, the host device 104 is configured to obtain one or more identifiers of available peripheral devices, e.g., by broadcasting an advertisement message or the like requesting that any nearby peripheral devices provide their identifiers (e.g., MAC addresses, or the like) to the host device 104. The broadcast, scan, or the like, at block 235, can be performed using a different protocol than the protocol used for the link 116. For example, in examples in which the link 116 is based on the Bluetooth protocol, the scan procedure at block 235 can use the Bluetooth Low Energy protocol.

At block 240, having obtained identifiers for nearby (e.g., within communications range) peripheral devices 108, the host device 104 is configured to determine whether any of the obtained identifiers match the identifier in the portion 168. When the determination at block 240 is negative, reconnection may be aborted, and the host device 104 can proceed to block 220, e.g., to await manual connection with the peripheral device 108 or another peripheral device. As in the case of an affirmative determination at block 235, when the determination at block 240 is negative, the host device 104 can be configured to delete the data from the portion 168.

When the determination at block 240 is affirmative, indicating that the peripheral device 108 is nearby, the host device 104 is configured to proceed to block 245, and send a reconnection command to the peripheral device 108. The reconnection command contains an identifier of the host device 104, and includes an instruction to the peripheral device 108 to initiate a new pairing process, to re-establish the link 116 without manual intervention by the operator of the devices 104 and 108. Depending on the outcome of the transmission at block 245, the host device 104 can then proceed to block 220. As discussed below, the peripheral device 108 may or may not act on the reconnection command. For example, if the host device 104 does not receive a pairing request within a predetermined time period after sending the reconnection command, the host device 104 can delete the data in the portion 168 and await a new, manually-initiated, peripheral connection at block 220.

Figure 5:
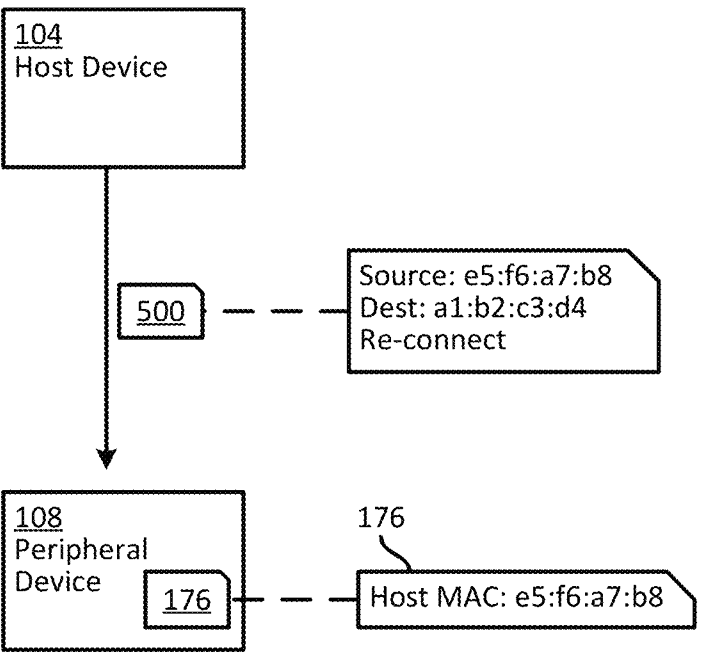
FIG. 5 is a diagram illustrating an example performance of block 245 of the method of FIG. 2.

Turning to FIG. 5, an example performance of block 245 of the method 200 is illustrated. In particular, the host device 104 is configured to send a reconnection command 500 to the peripheral device 108, e.g., over a different protocol than is used for the link 116. The command 500 need not require a pairing process, and can therefore be based on an advertisement message, beacon, or the like, along with a custom flag or other indicator in the command 500 for causing the peripheral device 108 to initiate a reconnection with the device 104. As seen in FIG. 5, the peripheral device 108 may maintain the MAC address of the most recent host device 104 in the memory portion 176. The peripheral device 108 can be configured to use the data in the portion 176 to determine how to handle the reconnection command 500.

Figure 6:
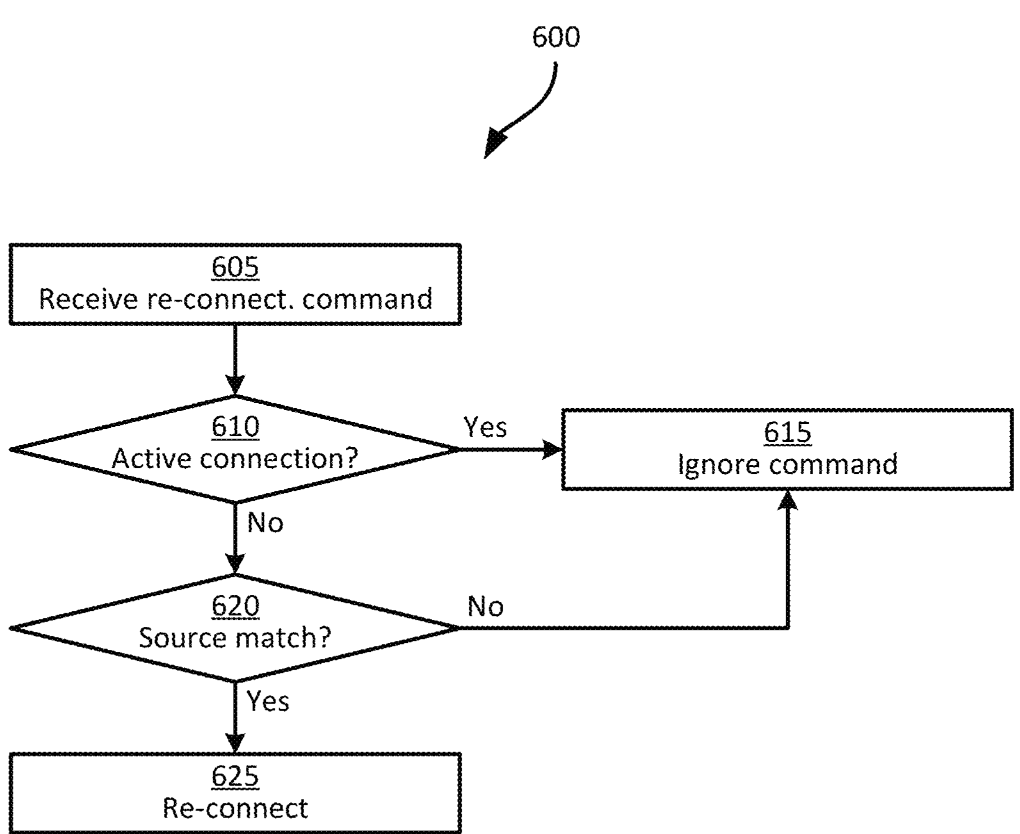
FIG. 6 is a flowchart of a method of handling reconnection requests at the peripheral device of FIG. 1.

Turning to FIG. 6, a method 600 of processing reconnection command at the peripheral device 108 is illustrated. At block 605, the peripheral device 108 is configured to receive a reconnection command, such as the command 500. At block 610, the peripheral device 108 is configured to determine whether the peripheral device 108 has an active connection with a host device (e.g., a different host than the host device 104). When the determination at block 610 is affirmative, the peripheral device 108 is configured to ignore the reconnection command at block 615, e.g., to avoid disrupting the currently active host connection.

When the determination at block 610 is negative, at block 620 the peripheral device 108 is configured to determine whether the source of the reconnection command 500 matches the most recent host device identifier stored in the portion 176. When the determination at block 620, is negative, the peripheral device 108 proceeds to block 615, e.g., discarding the reconnection command without taking further action. When the determination at block 620 is affirmative, the peripheral device 108 proceeds to block 626 and initiates a new pairing process with the host device 104 (more generally, with the sender of the reconnection command from block 605).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method, comprising:
establishing a connection with a peripheral device;
storing an identifier of the peripheral device and an operational state of the peripheral device;
periodically updating the stored operational state of the peripheral device;
subsequent to disconnection of the peripheral device, retrieving the stored operational state of the peripheral device;
determining whether the stored operational state satisfies a criterion indicating that the disconnection was intentional; and
controlling a reconnection with the peripheral device based on the determination,
wherein,
the stored operational state is selected from a set of operational states,
determining whether the stored operational state satisfies the criterion includes determining whether the stored operational state matches a predetermined one of the set of operational states, and
controlling the reconnection with the peripheral device includes when the stored operational state does not match the predetermined operational state, sending a reconnection command to the peripheral device, the reconnection command containing an identifier of a host device.

2. The method of claim 1, wherein
storing the identifier of the peripheral device and the operational state of the peripheral device includes storing the identifier of the peripheral device and the operational state in a predetermined persistent storage location.

3. The method of claim 1, wherein
controlling the reconnection with the peripheral device includes:
when the stored operational state matches the predetermined operational state, suppressing the reconnection.

4. The method of claim 3, further comprising:
deleting the stored operational state and the identifier of the peripheral device.

5. The method of claim 1, further comprising:
establishing the connection with the peripheral device using a first protocol; and
wherein controlling the reconnection includes:
when the stored operational state does not satisfy the criterion, scanning for the peripheral device using a second protocol.

6. A computing device, comprising:
a communications interface;
a memory; and
a processor configured to:
establish, a connection with a peripheral device via the communications interface;
store, in the memory, an identifier of the peripheral device and an operational state of the peripheral device;
periodically update the stored operational state of the peripheral device;
subsequent to disconnection of the peripheral device, retrieve the stored operational state of the peripheral device;
determine whether the stored operational state satisfies a criterion indicating that the disconnection was intentional; and
control a reconnection with the peripheral device based on the determination,
wherein,
the stored operational state is selected from a set of operational states, and
the processor is configured to determine whether the stored operational state satisfies the criterion by determining whether the stored operational state matches a predetermined one of the set of operational states.

7. The computing device of claim 6, wherein
the processor is configured to store the identifier of the peripheral device and the operational state of the peripheral device in a predetermined persistent location of the memory.

8. The computing device of claim 6, wherein
the processor is configured to control the reconnection with the peripheral device by:
when the stored operational state matches the predetermined operational state, suppressing the reconnection.

9. The computing device of claim 8, wherein
the processor is configured to:
delete the stored operational state and the identifier of the peripheral device.

10. The computing device of claim 6, wherein
processor is configured to:
establish the connection with the peripheral device using a first protocol; and
control the reconnection by:
when the stored operational state does not satisfy the criterion, scanning for the peripheral device using a second protocol.

* * * * *